Nov. 16, 1943.   C. S. STRAIT   2,334,449
LINE SHAFT COUPLING
Filed March 11, 1943
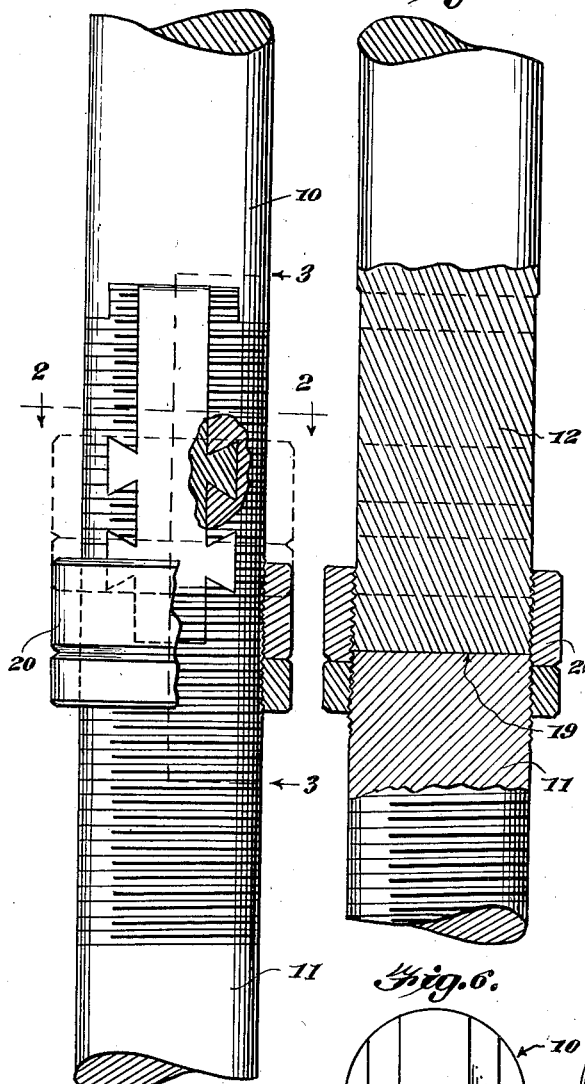
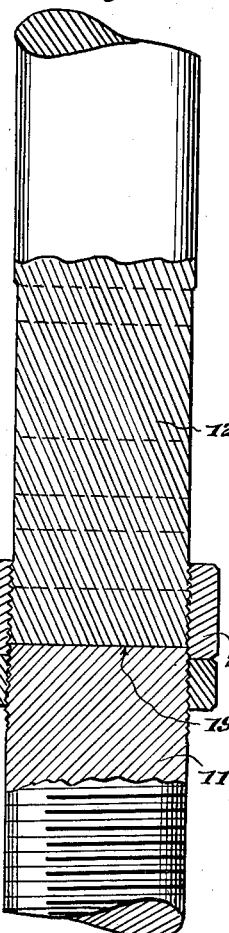
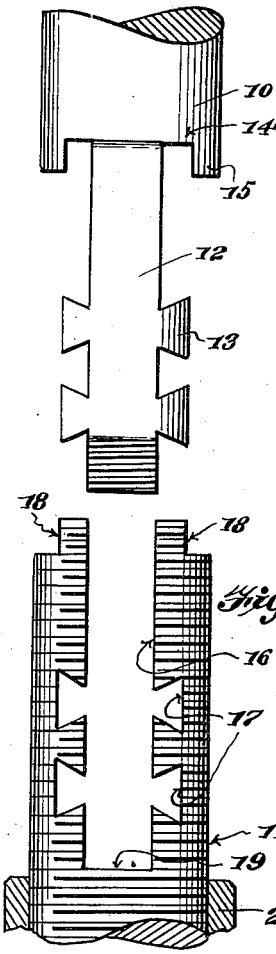
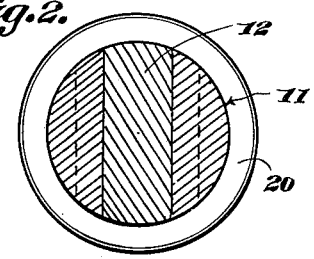
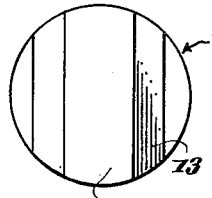
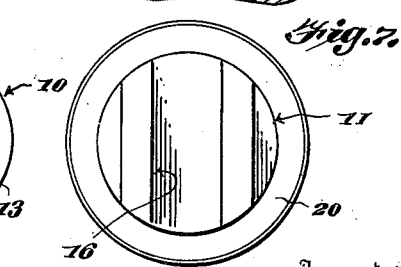
Inventor
CHARLES SHERMAN STRAIT Patented Nov. 16, 1943

2,334,449

UNITED STATES PATENT OFFICE 2,334,449

LINE SHAFT COUPLING

Charles Sherman Strait, Cleveland, Ohio

Application March 11, 1943, Serial No. 478,775

1 Claim. (Cl. 287—105)

This invention relates to a line shaft coupling and has for one of its objects the production of a simple and efficient means for detachably attaching the adjoining ends of a pair of shaft sections together.

A further object of this invention is the production of a simple and efficient means for connecting the ends of a line shaft together and shielding the interlocking portions of the junction of the shaft ends.

Other objects and advantages of the present invention will appear throughout the following specification and claim.

In the drawing—

Figure 1 is a side elevational view with certain parts being shown in section and illustrating the connection of two adjoining ends of a line shaft;

Figure 2 is a transverse sectional view taken on line 2—2 of Figure 1;

Figure 3 is a longitudinal sectional view taken on line 3—3 of Figure 1;

Figure 4 is a fragmentary side elevational view of the male section of the shaft coupling;

Figure 5 is a fragmentary side elevational view of the female section of the shaft coupling, a portion of the locking collar being shown in section;

Figure 6 is a bottom plan view of the male section of the coupling;

Figure 7 is a top plan view of the female section.

By referring to the drawing it will be seen that the line shaft coupling comprises a male member 10 and a female member 11. The male member 10 is provided with a projecting stem 12 arranged through its longitudinal center and projecting from one end thereof, the stem 12 being inset from two opposite sides of the male member and being substantially flush with the right angular sides thereof and being of the same width as the male member itself. The projecting stem or extension 12 is provided with a pair of spaced transversely extending dove-tail lugs 13 upon each of the inset sides of the stem or extension 12 as shown in detail in Figure 4 and the substantially flush sides of the extension near the lower end thereof are threaded as shown in Figure 4. The male member 10 is also provided with socket portions 14 adjacent the junction of the projecting stem or extension 12 with the body of the male member 10, thereby defining spaced side projecting lugs 15.

The female member 11 is provided with a longitudinally extending notch or cut-out portion 16 through its longitudinal center for the same depth as the length of the projecting stem or extension 12 of the male member 10. The female member 11 is also provided with a pair of spaced dove-tail sockets 17 in the side walls of the cut-out portion 16 arranged in matched relation with respect to the dove-tail lugs 13 and adapted to receive these dove-tail lugs when the male member 10 is assembled with the female member 11. The female member 11 is also provided with notches 18 at the outer extremity thereof for receiving the projecting lugs 15 of the male member 10.

When assembling the male and female members, the projecting stem or extension 12 is placed in a position to overlie the side of the cut-out portion 16 in a manner whereby the lugs 15 will overlie the notches 18 and the dove-tail lugs 13 will overlie the dove-tail notches 17. The projecting stem 12, with the lugs 15 and 13, is then slid into the cut-out portion 16 thereby placing the extension 12 with the lugs 13 and 15 within the cut-out portion 16, the notches 18, and the dove-tail notches 17, respectively.

A two-piece threaded collar 20 is threaded upon the externally threaded female portion 11 and while assembling is in a position below the lower end or inner end 19 of the cut-out portion 16 of the female member 11. After the male and female members have been assembled, the two-piece threaded collar 20 is threaded to a position to overlie the cut-out portions 16 and the extension 12, and this extension 12 may be threaded to a suitable length, the remaining portion of the extension being substantially flush by being arranged to properly permit the collar 20 to thread over the extension. It is the purpose of the present invention to permit the collar 20 to be extended to any suitable or desired position such as is indicated in dotted lines in Figure 1, or in full lines in Figure 1. The threaded collar 20 is preferably of a two-piece structure as shown, so that the two pieces may be bound together to lock one section against independent rotation and to hold the collar 20 in a set adjusted position.

It should be noted that the two-piece collar 20 which is carried by the lower or female portion 11 will reinforce the female portion at the junction of the male and female portions at the point where the collar overlies these two portions when assembled.

From the foregoing description it will be seen that a very simple and efficient means has been provided for assembling two abutting ends of a line shaft for connecting the male and female sections together and permitting the quick assembling of the sections and then firmly locking these portions or sections together through the medium of the two-piece locking collar which may be moved to an overlying or overlapping position thereby preventing lateral displacement of the sections after having once been assembled.

It should be understood that the present coupling may be utilized for coupling the ends of a line shaft together or for connecting rods or other suitable structures without departing from the spirit of the invention.

Having described the invention, what is claimed as new is:

A device of the class described comprising a male section and a female section, the male section having a projecting extension, the female section having a cut-out portion for receiving said extension, the projecting extension having oppositely arranged laterally extending dove-tail lugs arranged in spaced relation upon opposite sides of the extension, the female section having dove-tail sockets formed adjacent the cut-out portion and arranged in matched relation with respect to the dove-tail lugs in a manner whereby the dove-tail lugs will fit into said sockets when the male and female sections are assembled, a threaded collar movable to an overlying position with respect to the projecting extension and the cut-out portion for holding the sections against accidental displacement, said male section having a socket adjacent the junction of the projecting extension with the body portion of the male member upon opposite sides of the extension thereby defining shielding lugs arranged in spaced relation with respect to the inner end of said extension, said female section having projecting lugs at the end thereof and adapted to fit within the sockets adjacent the inner end of said extension and adapted to abut against said shielding lugs.

CHARLES SHERMAN STRAIT.